United States Patent [19]

Domek

[11] 4,284,177
[45] Aug. 18, 1981

[54] SELF-ADJUSTING SHOCK ABSORBER HAVING STAGED METERING

[75] Inventor: John A. Domek, Wheaton, Ill.

[73] Assignee: Efdyn Corporation, Geneva, Ill.

[21] Appl. No.: 38,932

[22] Filed: May 14, 1979

[51] Int. Cl.³ .............................................. F16F 9/48
[52] U.S. Cl. .................................. 188/280; 188/287; 188/289; 267/8 A
[58] Field of Search ............... 188/287, 286, 318, 297, 188/315, 314, 289, 280, 285; 267/8 R, 8 A, 136; 213/43

[56] References Cited

U.S. PATENT DOCUMENTS

| | | | |
|---|---|---|---|
| 3,556,268 | 1/1971 | Fister | 188/287 |
| 3,840,097 | 10/1974 | Holley | 188/287 |
| 4,071,122 | 1/1978 | Schupner | 188/285 |

Primary Examiner—Douglas C. Butler
Attorney, Agent, or Firm—Darbo & Vandenburgh

[57] ABSTRACT

In a fluid displacement-type shock absorber, a piston responding to an impacting load moves within a cylinder, forcing hydraulic fluid therein out of one or more orifices into a reservoir. The resistive force of the piston depends upon its velocity, and the area of the orifice or orifices which control the rate at which the fluid can be displaced. The total available orifice area for discharging fluid from the cylinder is progressively reduced as the piston is displaced from its initial position upon impact. The fixed orifice structure defines successive control regions, each of which is designed to provide a predetermined resistance profile and related deceleration control for a respective load system or mass system. The lightest mass system, traveling at its maximum velocity within the design range, reaches its limiting deceleration rate in the first control region. The heaviest mass system traveling at its lowest velocity within the design range, reaches its limiting deceleration rate in the last control region. All loads in the design range are decelerated over the full stroke of the piston in being brought to rest.

16 Claims, 6 Drawing Figures

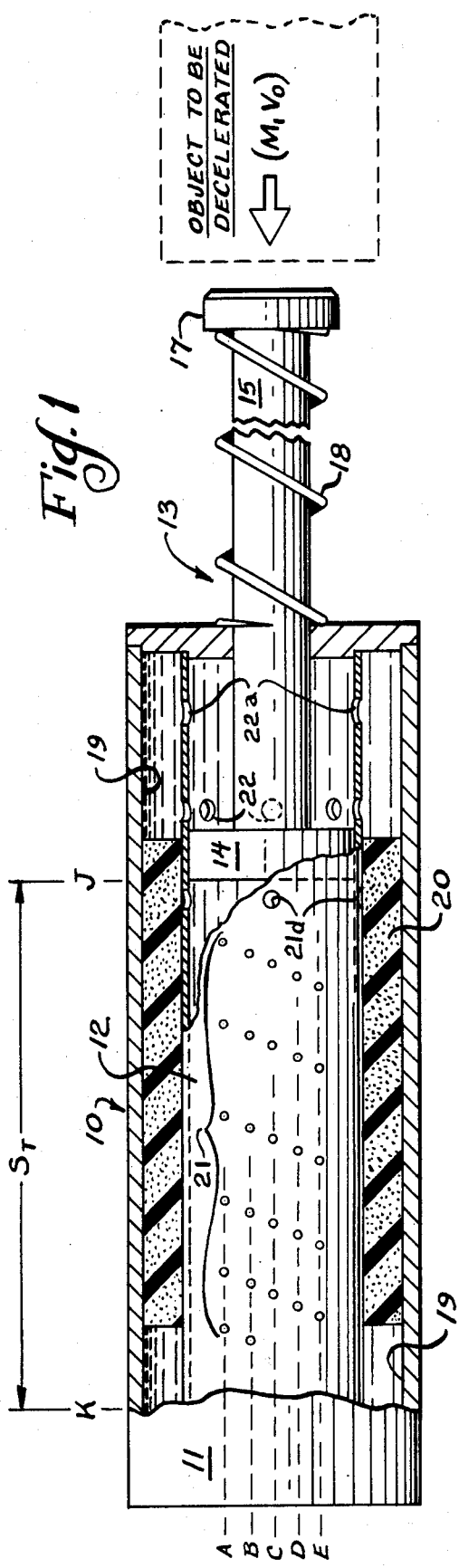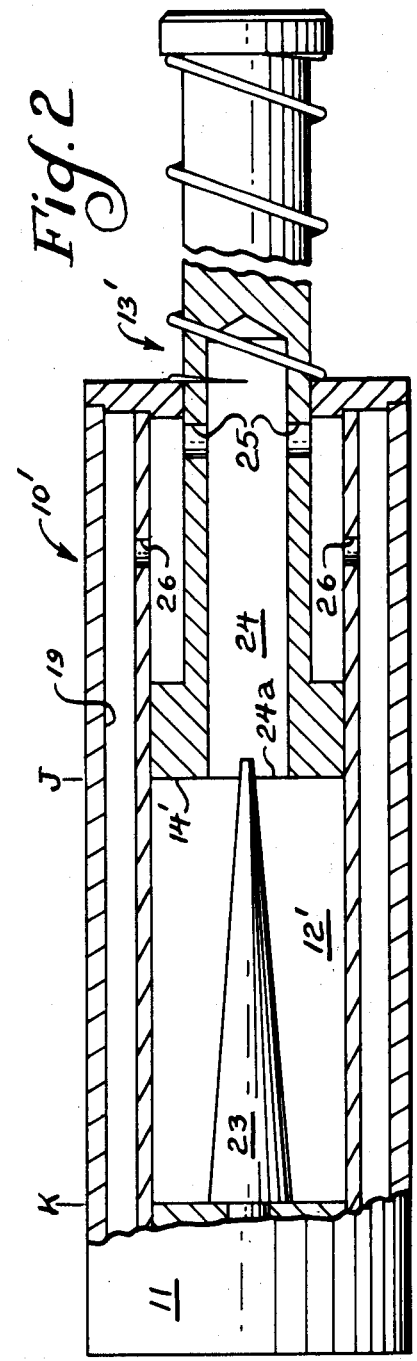

Fig. 3
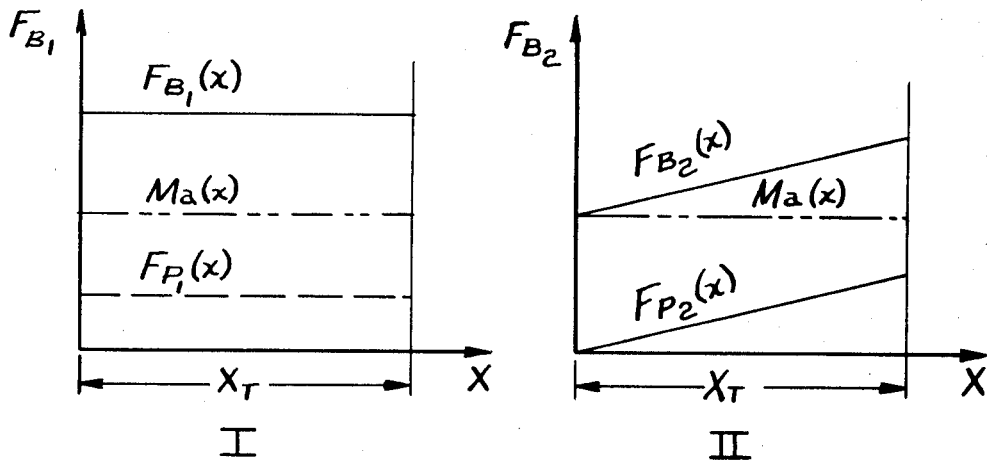
I
II
EQ.(1)  $Me(x) = \left[\dfrac{F_P(x)}{a(x)} + M\right]$
EQ.(2)  $F_B(x) = Me(x)a(x)$
EQ.(2a) $F_B(x) = F_P(x) + Ma(x)$
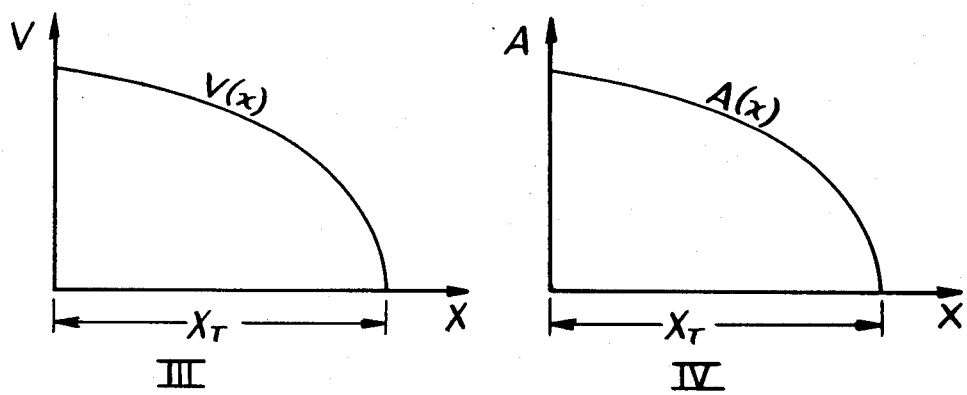
III
IV
EQ(3) $\dfrac{V(x)dV(x)}{dx} = -a(x)$     EQ(5) $A(x) = A(0)\left[1 - \dfrac{x}{X_T}\right]^{1/2}\left[\dfrac{Me(0)}{Me(x)}\right]^{1/2}$
FOR $a(x) = a(0) = a(X_T) = $ CONSTANT     FOR $Me(x) = Me(0) = Me(X_T) = $ CONSTANT
EQ(4) $V(x) = V(0)\left[1 - \dfrac{x}{X_T}\right]^{1/2}$     EQ(6) $A(x) = A(0)\left[1 - \dfrac{x}{X_T}\right]^{1/2}$

SELF-ADJUSTING SHOCK ABSORBER HAVING STAGED METERING

BACKGROUND OF THE INVENTION

The invention relates generally to the field of shock absorbers or energy absorption or energy dissipation devices, and particularly to fluid displacement-type shock absorbers.

Shock absorbers are normally designed to decelerate a load, i.e., a moving mass, to rest without damage. Most loads have a deceleration limit expressed in G's as a multiple of the effect of gravity. Approaching or exceeding the G limit by stopping too abruptly, risks substantial damage to the load itself. Deceleration which is too abrupt can burst hydraulic shock absorbers. Moreover, since the shock absorber transmits force to the structure on which it is mounted, the mechanical strength of the structure must also be taken into account, particularly if a load may have a positive velocity at the end of the stroke of the shock absorber, and structural or mechanical stops are used to position such load systems, wherein, the remaining energy of these systems are absorbed elastically by the restraining structure.

There are many industrial applications, for example, railroads or foundries, where very heavy loads are encountered requiring very large stopping forces. In a foundry, for example, where large metal castings are made, the sand molds into which the molten metal is poured, referred to as the "cope" and "drag", are conveyed to and from their respective stations on a "head carriage". These carriages, weighing on the order of 50,000 pounds, are generally accelerated to velocities of 5 feet per second by pneumatic cylinders which apply forces on the order of 15,000 pounds. Typical hydraulic fluid displacement-type shock absorbers used for this type of application have bore sizes ranging from 3 to 4 inches, and piston strokes or displacements of 6 to 8 inches. It is conventional in this type of shock absorber to provide some means of diminishing the orifice area used to control the rate of fluid flow out of the cylinder, under the action of the piston, into a reservoir of some kind. This can be accomplished with a plurality of axially spaced holes through the cylinder wall. As these holes are passed up by the piston head, they are covered and no longer are available as exit ports for the fluid. The size and spacing of the orifice holes used determines the deceleration characteristics that can be provided by such devices. An example in the railway industry is referred to in U.S. Pat. No. 3,301,410 to Seay.

One of the problems in industrial applications such as foundries is accommodating the wide variety of load systems encountered, whether due to variations of mass and/or velocity alone or in combination with constant or varying propelling forces. In very simple terms, a relatively stiff shock absorber is needed for a heavy mass-high intensity load system, and a relatively soft shock absorber is needed for a light mass-low intensity load system. Conventional shock absorbers are designed to handle constant mass-constant intensity load systems.

The conventional way to accommodate a variety of constant mass-constant intensity load systems is to use what has been called an "adjustable" shock absorber having some means of mechanically adjusting or presetting the relative size of the orifices in a multi-port hydraulic shock absorber, as shown, for example, in U.S. Pat. No. 4,071,122 to Schupner, owned by the assignee of this application. While it is generally understood that the most efficient way to arrest a constant mass-constant intensity load system is to provide a constant level of resistance over the entire stroke of the shock absorber, and thereby, constant deceleration, the design efficiency of conventional adjustable shock absorbers is seriously hampered by the inability to reach an optimum preadjustment for the shock absorber. Such preadjustment not only requires advance knowledge of the exact mass, and intensity of the load system which will be encountered, and the ability to pre-establish the optimum adjustment setting required without use of expensive electronic instrumentation but also that the intensity of the load system remain constant throughout the deceleration excursion. Once adjusted for a specific constant mass-constant intensity load system, the conventional shock absorber can only handle small deviations from the exact mass, and intensity of this load system. For example, it cannot efficiently stop a load system whose mass may be lower or higher than that accounted for by the adjustment setting utilized, or whose intensity tends to vary over the stroke due to increasing propelling force. Moreover, conventional adjustable shock absorbers are only provided with one mode of adjustability, that is, the size of their orifices can be adjusted but their locations cannot be. The conventional adjustable shock absorber can therefor do no more than adjust for constant mass-constant intensity load systems, for example, by rotating a sleeve to eclipse the orifices in a fixed spaced hole system as shown, for example, in U.S. Pat. No. 4,071,122. This type of sleeve structure also introduces a temperature-dependent error factor due to leakage, as some of the hydraulic fluid leaving the orifices flows between the outside of the pressure tube, containing the orifices, and the inside of the adjustment sleeve, containing the adjustment apertures, thereby bypassing the controlling apertures.

SUMMARY OF THE INVENTION

The general objective of the invention is to greatly increase the operating range of a fluid displacement-type shock absorber by designing a specific orifice structure that can accommodate a large number of different load systems or mass systems, wherein the intensities of these load systems or mass systems may remain constant or vary over a wide range, whereby, the need for any adjustments of the controlling orifices is eliminated, and furthermore, to provide predetermined deceleration control for each mass system or load system considered within the design range of the device, and to accomplish such deceleration control most efficiently by utilizing the full stroke or full displacement of the device for arresting each individual mass system or load system considered.

These and other related objects of the invention are achieved in a shock absorber with a fixed orifice structure inherently providing adaptive control of two or more mass systems, of constant, or varying intensities. The orificed structure contains a progression of control regions, each distinctively different in orifice area size, wherein the area size of each control region diminishes progressively as a continuum, from the origin of the progression (zero stroke position of piston displacement) to stroke termination; wherein, each control region is responsive to a corresponding mass system and its respective intensity; wherein, the equivalent mass of the mass system is used as a measure of the intensity of the mass system; wherein, the progression referred to is based upon the ordering of all mass systems or equivalent mass systems considered within the selected design range of the device, and the deceleration rates imposed upon these mass systems or equivalent mass systems is by design choice; wherein, the rate at which the area size of each control region diminishes with respect to displacement can be defined by the deceleration rate imposed upon each respective mass system by design choice; wherein, each control region is preferably designed to provide a constant rate of deceleration for its respective mass system; wherein, control regions designed for externally motivated or externally propelled mass systems are preferably designed for speed controlled mass systems to accommodate the highest intensity levels of such mass systems during their deceleration modes; and wherein, this invention device may also be referred to as a deceleration control device.

In that each control region of the device according to the invention is designed to provide a specific deceleration rate for its corresponding mass system, the ordering of these control regions must comply with the ordering of the mass systems, the ordering used by this invention being from the smallest mass system of lowest intensity to the largest mass system of highest intensity. In this design, for example, the first control region that the piston traverses from its initial position, will provide a constant rate of deceleration for the smallest mass system of lowest intensity, whereas, the last control region will provide a constant rate of deceleration for the largest mass system of highest intensity. If the available exit orifice area is plotted against piston displacement for the entire stroke, the result is a graph which depicts a continuous series of connected segments of different exponential curves, starting at the beginning of the stroke with the total area or all orifices used, and decaying to zero at the end of the stroke.

If a series of axially spaced holes is used, the result is a step function approximation of an exponential segment curve. If a specifically contoured tapered metering pin orifice structure or equivalent is employed, a smooth orifice curve can be obtained. In one embodiment, the diameter of the holes in a given control region is held constant and the exponential decay is provided solely by axial spacing of the holes, wherein, the sizes of the holes may or may not vary from region to region.

In accordance with the invention, an incoming mass system in a sense "seeks out" its corresponding control region. If the mass system is an intermediate mass system of intermediate intensity, it will tend to reach its maximum allowed deceleration in its respective intermediate control region.

The unique aspects of the invention include the ability of a single device, without the need of adjustment mechanisms, to provide predetermined deceleration control, and total arrestment for two or more different mass systems, wherein, these mass systems may be constant intensity mass systems or mass systems of varying intensity, and to achieve such deceleration control most efficiently by utilizing the full displacement stroke of the device for the arrestment of each of the mass systems; wherein, the total displacement stroke of the device is a function of (a) the total number of different mass systems being controlled, (b) the velocities of each of these mass systems at the zero stroke position of piston displacement, and (c) deceleration rates imposed upon these mass systems by design choice.

DESCRIPTION OF THE DRAWINGS

FIG. 1 is an elevational view of a shock absorber according to the invention having a portion of the outer sleeve broken away to reveal the inner cylinder with a pattern of holes to be dimensioned and spaced as described hereinafter according to the invention.

FIG. 2 is a view similar to that of FIG. 1, except that the inner cylinder is in section, illustrating an alternate embodiment employing a tapered pin dimensioned and contoured as described hereinafter according to the invention.

FIG. 3 is a composite containing Graphs I, II, III and IV depicting buffing force $F_B(x)$, velocity $V(x)$, and orifice area $A(x)$ versus displacement, respectively, and related Equations 1 through 5.

DESCRIPTION OF SPECIFIC EMBODIMENTS

Figure 4:
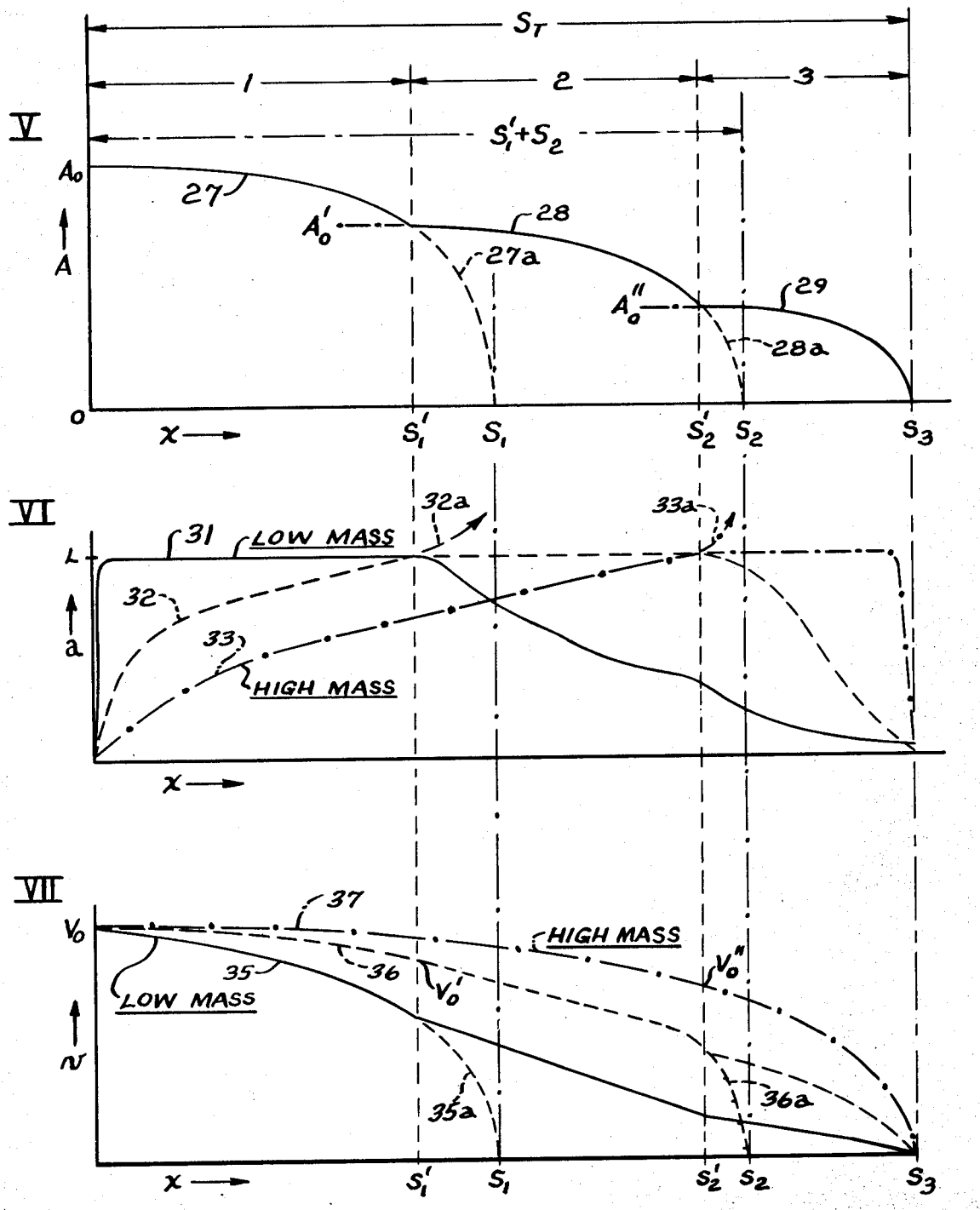
FIG. 4 is a composite containing Graphs V, VI and VII of orifice area, deceleration and velocity versus displacement, respectively, according to the invention.

The following disclosure is offered for public dissemination in return for the grant of a patent. Although it is detailed to insure adequacy and aid understanding, this is not intended to prejudice that purpose of the patent which is to cover each new inventive concept therein no matter how others may later disguise it by variations in form or additions or further improvements.

The shock absorber of FIG. 1 comprises a cylinder assembly 10 having an outer cylindrical body or casing 11 and a coaxial inner cylinder 12. A piston assembly 13 has a piston 14 sealingly slidable within the inner cylinder 12. A piston rod 15 is coaxially secured to the piston 14 and extends out through a coaxial opening in the cylinder assembly 10 terminating in a shock receiving pressure member 17. The other ends of the cylinders 11 and 12 are closed. A coil compression spring 18 coaxially surrounding the distal portion of the piston rod 15 bears against the outer face of the cylinder assembly 10 and the annular shoulder provided by the pressure member 17 thus urging the piston rod 15 out of the cylinder assembly 10 and causing the piston 14 to assume an initial position J as indicated in FIG. 1. The annular volume between cylinders 11 and 12 forms a reservoir 19 for hydraulic fluid. A resilient cellular pad 20, such as nitrogen molecules encapsulated in rubber, is located in reservoir 19. The inner cylinder 12 is also filled with hydraulic fluid and is in fluid communication with the reservoir 19 via axially and circumferentially spaced holes 21 and 21d formed through the wall of the inner cylinder 12 in the stroke portion of the cylinder, i.e., between the initial and final positions, J and K, of the face of the piston 14.

The cylinder 12 has one or more flow openings 22 which permit filling the inner cylinder 12 with hydraulic fluid behind the piston 14 during the compression stroke of the piston 14. A check valve (not shown) is typically arranged in the piston 14 to seal the piston 14 during the compression stroke. On the return stroke, the check valve opens allowing hydraulic fluid to flow from the portion of the cylinder 12 behind the piston 14 to the portion of the cylinder 12 ahead of the piston via the piston 14. Openings 22a (shown in phantom) in the inner cylinder 12 at the end around the piston rod 15 place the portion of the inner cylinder 12 behind the piston 14 in continuous fluid communication with the reservoir 19. Thus, in effect, the portion of the inner cylinder 12 behind the piston forms a part of the hydraulic fluid reservoir 19.

Apart from the orifice structure, the structure of the shock absorber shown in FIG. 1 may be conventional. Further details of the conventional structure, to the extent applicable or desirable, can be found in the prior literature, for example, U.S. Pat. Nos. 3,301,410 and 4,071,122.

In use, the cylinder assembly 10 is typically mounted to a fixed structure. If desired, however, the piston rod assembly 13 may be secured to a fixed structure and the opposite face of the cylinder assembly 10 can be left free to receive the shock force.

When an object or mass system strikes the pressure member 17, its momentum is transmitted to piston assembly 13, which in turn transmits this momentum to the fluid contained in cylinder 12. As a result of this momentum exchange, piston assembly 13, and the adjacent body of fluid it impinges upon are accelerated. The resultant velocity of the object or mass system, the piston assembly, and the adjacent body of fluid depends upon the rate at which the body of fluid can be displaced from orifices 21 and 21a by the impending momentum of the object or mass system. As the piston 14 moves away from its initial position in the cylinder 12, fluid is forced out of the holes 21a and 21 into the reservoir 19. At the beginning of the compression or working stroke of the piston 14, the amount of resistive force provided by holes 21 and 21a is determined by the total area of these holes or orifices. For example, if these are n holes, each of diameter d, the total area through which fluid can escape from the inner cylinder 12 would be $n\pi d^2/4$. As the piston 14 forces oil out through the holes, it would eventually come to the point where it passes by and closes off the hole which is closest to the face of the approaching piston 14. Once this first hole had been passed, relative to an n-hole system, the area available for discharging fluid would be $(n-1)\pi d^2/4$, one hole having been eliminated from the remaining orifice pattern or orifice structure. As the piston continues its working stroke, the holes are successively passed and closed by the piston, thereby progressively diminishing the number of holes discharging oil from the cylinder 12 into the reservoir 19. As a result of the decreasing area available, relative to the impending momentum of the object or mass system, the rate at which fluid can escape the cylinder is decreased, the objective being to decelerate the moving object or mass system to a rest position at a controlled rate before the piston 14 reached the end of its stroke at K.

Axially spacing the holes 21 provides a way of making the orifice area decline stepwise as a function of piston displacement. The circumferential displacement of the holes has no effect on the operation of the orifices. It is their axial displacement and diameter which determines the decay rate of the orifice area. Arbitrarily, five circumferential displacements, each 15° apart, are designated as A, B, C, D and E, as indicated in FIG. 1. There are other known orifice structures for accomplishing this purpose, some of which do it smoothly or continuously instead of stepwise. One of these is shown schematically in FIG. 2. As in the embodiment of FIG. 1, the shock absorber of FIG. 2 comprises a cylinder assembly 10', including a similar outer cylinder 11 and a modified coaxial inner cylinder 12', the annular volume between them again forming a similar oil reservoir 19. Instead of holes 21, the cylinder assembly 10' has a coaxial metering pin 23 tapered down toward its distal end. The larger end of the metering pin 23 is secured coaxially to the closed end of the cylinder 12' in close proximity to the end position K of the full stroke. The pointed end of pin 23 is received in apertured coaxial cylindrical bore 24 dimensioned to receive the entire working length of the metering pin 23. As the piston assembly 13' moves through its working stroke, the bore 24 is in communication with the reservoir 19 via holes 25 and 26 through the piston assembly 13 and the cylinder 12', respectively. As the piston assembly 13' moves away from its initial position, the metering pin cross-section intercepted by the opening in the piston 14' increases continuously. The pin 23 can be contoured according to any given mathematical relationship to displacement of the piston 14'. Examples of hydraulic shock absorbers using metering pins to determine the orifice area as a function of displacement are shown in U.S. Pat. Nos. 3,729,101 to Brambilla et al, 3,774,895 to Willich et al, 3,568,856 to Knippel, 3,693,768 to Erdmann and 3,348,703 to Powell et al.

Except where otherwise indicated, in the following description and in the claims, the term orifice structure or orifice means is meant to encompass axially displaced holes and tapered metering pins. In addition, the term is intended to encompass slots, grooves, projections and any other types of structural features in a hydraulic shock absorber which has the effect of progressively decreasing the rate at which fluid can escape from the cylinder as a function of piston displacement. Any structure or combination of structures which has this capacity can be employed to implement the invention described herein.

FIG. 3 shows four graphs which illustrate the underlying principles of orifice area metering versus piston displacement in fluid-displacement shock absorbers. Assume that an object to be decelerated, having mass M, and propelling force $F_p$, strikes the piston assembly of a hydraulic shock absorber with an initial velocity $V(o) = V_o$. The object has a design deceleration limit $a(x) \leq L$ which is not to be exceeded while the object is decelerated from $V_o$ to zero over a given distance or stroke $X_T$.

The best way to keep peak deceleration low is to design the system so that the deceleration is as constant as possible. From Graphs I, II and Eq. (2), it is apparent that in order to maintain a(X) constant, the ratio $F_B(x)/M_e(x)$ must remain constant. Graph III and Eq. (4) illustrate pictorially and mathematically the velocity versus displacement profile V(x) for constant deceleration. Graph IV and Eq. (6) illustrate pictorially and mathematically the orifice area versus displacement profile A(x) required to decelerate the equivalent mass system $M_e(x)$, depicted in Graph I, at a constant rate. Note that Eq.(6) is derived from Eq.(5) for $M_e(o) = M_e(x) = M_e(x_T) = $ constant, and that V(x) and A(x) decay at the same exponential rate relative to displacement when this is true. Manufacturers of conventional fixed orifice, and adjustable orifice shock absorbers design their orifice structures to accommodate such mass systems, and/or equivalent mass systems. That is, mass systems wherein $F_p(x)$ and thereby $M_e(x)$ remain constant throughout the intended deceleration stroke $x_T$.

For a spaced hole orifice structure defining a single control region wherein all orifice holes are of the same size, and
d = Diameter of orifice hole
N = Total number of orifice holes
n = $n^{th}$ orifice hole
n = 1, 2, 3 ... N
A(n) = Remaining orifice area as a function of the $n^{th}$ hole location, then $$A(n) = (N-n)\pi d^2/4 \qquad \text{Eq. (7)}$$

From Eq. (5), Eq. (6) and Eq. (7), the spacing of orifice holes can be expressed as follows:

$$X = X_T\left\{1 - \left(1 - \frac{n}{N}\right)^2 \frac{Me(x)}{Me(o)}\right\} - \frac{d}{2} \qquad \text{Eq. (8)}$$

$$X = X_T\left\{1 - \left(1 - \frac{n}{N}\right)^2\right\} - \frac{d}{2} \qquad \text{Eq. (9)}$$

where the location of the axis of each orifice hole is determined by subtracting half its diameter d/2 in Equations (8) and (9).

When metering by conventional methods, that is, using a single control region, and assuming that the equivalent mass as a function of displacement x remains constant, that is, $Me(x) = Me(0) = Me(X_T) = $ Constant, where X = 0 defines the beginning of the control region, and X = $X_T$ defines the end of the control region or its total extent, it is apparent from Equation (8) that the spacing of such orifice holes becomes solely a function of the number and size of holes as given in Equation (9).

It is this principle that the manufacturers of conventional adjustable shock absorbers use to design their orifice structures, namely, by maintaining a fixed spaced hole system and simultaneously varying the area size of all orifice holes by equal amounts to maintain the n/N ratio given in Equation (9) constant. This allows such manufacturers to adjust for different mass systems with one mode of adjustability, and to provide a constant rate of deceleration for such mass systems when their equivalent mass remains constant throughout the deceleration excursion.

This is also the reason why conventional adjustable shock absorbers cannot be adjusted to provide a constant rate of deceleration for mass systems wherein the propelling force varies with displacement, such as depicted in Graph II, and why such systems are inefficient.

To simplify the explanation of the principles of the present invention, I shall refer to the intensity of mass systems as a measure of the equivalent mass of these systems, wherein this measure is given in Equation (1) of FIG. 3.

The present invention utilizes the principle of cascading control regions as a continuum within the extent of a common stroke control entity. Each control region is specifically designed to provide a constant rate of deceleration for its respective or corresponding mass system in a specific sequential order. The order referred to is from the lowest intensity to the highest intensity for such mass systems or from the lightest mass to the heaviest mass for non-propelled mass systems.

This method allows for the control of mass systems of constant intensity as well as mass systems of increasing or varying intensity within a given range of design.

Within the range of design, such mass systems eventually reach their respective control regions as they progress into the common stroke control entity to their common location of total arrestment, that is, stroke termination.

FIG. 4 (Graphs V-VII) illustrates the basic principle of the present invention. Graph V shows orifice area in a fluid displacement-type shock absorber as a function of piston displacement from an initial position of the piston at x = 0 corresponding to the point of impact of an object to be decelerated. The initial segment of the area curve 27 is a parabola of the same form as in Graph IV. Taken together with the dashed extension 27a of curve 27, it represents the decay rate of the orifice area $A_o$ over a stroke of length $S_1$. Instead of allowing the original curve 27 to decay to zero at $S_1$ through the extended portion of the curve 27a, the progress of parabola 27 is halted at point $S'_1$. Truncation point $S'_1$ defines the beginning of a new parabola of amplitude $A'_o$. The decaying orifice area beginning at point $S'_1$ follows the trajectory 28. At point $S'_1$ the curve of the orifice area A is continuous but changes direction abruptly to a lower rate of decay. The area decays along curve 28 and if allowed to proceed as in the Graph IV, it would traverse the dashed extended curve 28a and decay to zero at point $S_2$, that is, the stroke length from the start of parabola 28 at point $S'_1$. Instead of allowing the parabola 28 to complete its trajectory, the progress along curve 28 is arrested at truncation point $S'_2$ where a new parabola with initial amplitude $A''_o$ is begun. If this is the last of the cascading parabolas, the orifice area is allowed to decay to zero over the full trajectory of the curve 29. The orifice area finally declines to zero at point $S_3$ measured from the start of curve segment 29 at $S'_2$.

The connected parabolic line segments 27, 28 and 29 in Graph V define control regions 1, 2 and 3. By determining the initial orifice area $A_o$ and the truncation points S' each control region can be designed for constant deceleration of a different mass system. Region 1 with curve segment 27 is designed for constant deceleration of the lowest intensity mass system. Regions 2 and 3 are designed for constant deceleration of an intermediate intensity and the highest intensity mass systems, respectively.

In Graphs VI and VII of deceleration and velocity versus displacement, respectively, three loads to be decelerated, referred to as loads 1, 2 and 3, have different mass and the same impact velocity $V_o$. Each object also has the same design limit L for maximum deceleration, and no propelling force. Examining the curves in Graphs VI and VII together, one will notice that the order of the load intensities is reversed from top to bottom. In control region 1, the load with common velocity $V_o$ and the lowest mass undergoes constant deceleration as indicated by curve 31 in Graph VI and the corresponding curve 35 in Graph VII. Curve 35 is a true parabola along with its extension 35a to the virtual stroke $S_1$. Following the corresponding deceleration curve 31 in Graph VI, object 1, (lowest intensity load) undergoes constant deceleration throughout region 1 and decreasing deceleration in regions 2 and 3. Similarly, for the intermediate intensity load, object 2, the deceleration curve 32 and velocity curve 36 indicate that the load undergoes constant maximum deceleration L in control region 2, and outside control region 2, deceleration is less than L. Thus in Graph VII, curve 36 between the truncation points S' (i.e., control region 2) is a true parabola. Likewise, for the highest intensity load, the deceleration curve 33 in Graph VI and velocity curve 37 in Graph VII indicate that the maximum design constant deceleration limit L is realized only in the last control region, throughout which, that is, from point $S'_2$ to $S_3$, the velocity curve is parabolic.

With respect to the low mass system for which region 1 is designed, the curve 27 does not continue along it projected path 27a; at $x = S'_1$ the rate of orifice closure "slows down" or "backs off" at the start of curve segment 28, not unlike reducing the pressure on a brake pedal. Thus the deceleration rate falls as shown in Graph VI.

The graphs in FIG. 4 are exaggerated for the sake of clarity. The total energy expended by the shock absorber in bringing the object to rest is directly proportional to its mass and must ultimately dissipate all of its kinetic energy ($\frac{1}{2} mv^2$) which it had at impact. This is reflected in Graph VI since the product of area under each of the curves and the respective mass is representative of the total kinetic energy ($\frac{1}{2} mv^2$) of each respective mass system, that is $$m \int_0^{ST} a(x)dx = \tfrac{1}{2} m V^2 \qquad \text{Eq. (10)}$$

where the intensity of mass system $m = m_e(x) =$ constant, and $a(x)$ represents the deceleration rate of this mass system as a function of displacement, and $S_T = S_1' + S_2' + S_3$ or the total stroke illustrated in Graph V.

It is also important to note that subsequent control regions are designed with reference to the intensity of the load system at the beginning of the control region. Thus, for the intermediate mass load, the second control region is designed to give constant deceleration to an object of intermediate intensity now traveling at velocity $V_o'$ having already been decelerated through control region 1. Similarly, the third control region is designed to provide constant deceleration for a load with the highest mass or highest intensity of the three, now traveling at a velocity $V_o''$, having been decelerated through the two preceding control regions.

The initial total orifice area $A_o$ is chosen solely with respect to the load system having the lightest mass and/or intensity. The first truncation point $S'_1$ terminating the first control region and starting the second region is determined as that displacement of the piston at which the first intermediate mass (load system of intermediate intensity) reaches its maximum allowable deceleration L as shown in Graph VI. If the rate of orifice closure continued to follow the projected curve 27a in Graph V, the intermediate mass curve 32 would exceed the deceleration limit as shown by projecting the curve 32a in Graph VI. Instead, a new parabolic decay of the orifice area is begun at point $S'_1$ to control the deceleration of the intermediate mass. Similarly, the last truncation point $S'_2$ is determined as that displacement of the piston at which the object with the highest mass (load system of highest intensity) first reaches its maximum deceleration Limit L. If the orifice area were to continue to decay at the rate exhibited by curve 28a in Graph V, the high mass load would exceed its deceleration limit as indicated by the projected curve 33a.

The system described above in connection with FIG. 4 can be extended to any number of control regions as desired. In certain industrial application, load systems of constant and varying intensities can be classified into predictable discrete catagories. For example, the object to be decelerated on a particular process line may be 12,000 pounds or 30,000 pounds and it may be travelling at either 2 feet per second or 8 feet per second, and be motivated by a propelling force of 6,000 lbs. or 8,000 lbs., wherein the propelling force motivating the object may vary from 0 lbs. to either of the maximum values given or remain constant at either of the two values given. The sixteen distinct combinations of weight (mass), velocity, and propelling force can be specifically accmmodated in the orifice pattern according to the invention. It can also be shown that the deceleration rate imposed upon any intermediate load system, that is, any load system not defined but whose intensity lies between the minimum and maximum values designed for, by a device of this invention, shall not exceed the maximum limits of design, when the impact velocity of this intermediate load system falls within the design range.

A shock absorber can also be designed, according to the invention, having only two control regions. Since this is the least complex system, a specific shock absorber with two control regions will be described in detail.

EXAMPLE 1

In this example, the shock absorber orifice structure according to the invention is designed to handle two load systems, each having distinctively different intensities or equivalent masses. To simplify matters, the weight of the impacting objects, Nos. 1 and 2, will be arbitrarily chosen as 10,000 and 20,000 pounds, respectively. The masses of these objects, $M_1 = 310.56$ lb.-sec.$^2$/ft and $M_2 = 621.12$ lb-sec.$^2$/ft, are obtained by dividing their respective weights by 32.2 ft/sec.$^2$. Let $v_1$ and $v_2$ be the changing velocities of objects 1 and 2 during the stroke. At the point of impact, $x = 0$, both objects are defined to have the same impact velocity $v_1 = v_2 = V_o = 4$ ft/sec. To further simplify matters, consider the deceleration limit L to be 24 ft/sec.$^2$, the same by design for both objects and assume that they have no propelling force.

Since there are no propelling forces involved, the intensities of these two load systems can be defined by their respective rest masses [see Eq. (1) in FIG. 3]. The controlling orifice structure required to accommodate these two load systems will therefore require two consecutive control regions 1 and 2. With reference to Graph VIII of FIG. 5, $S_1$ is the total virtual stroke length of region 1, and $S_1'$ is the actual stroke of region 1, i.e., the truncation point for first orifice area decay curve. $S_2$ is the actual stroke length of the last region, region 2.

Figure 5:
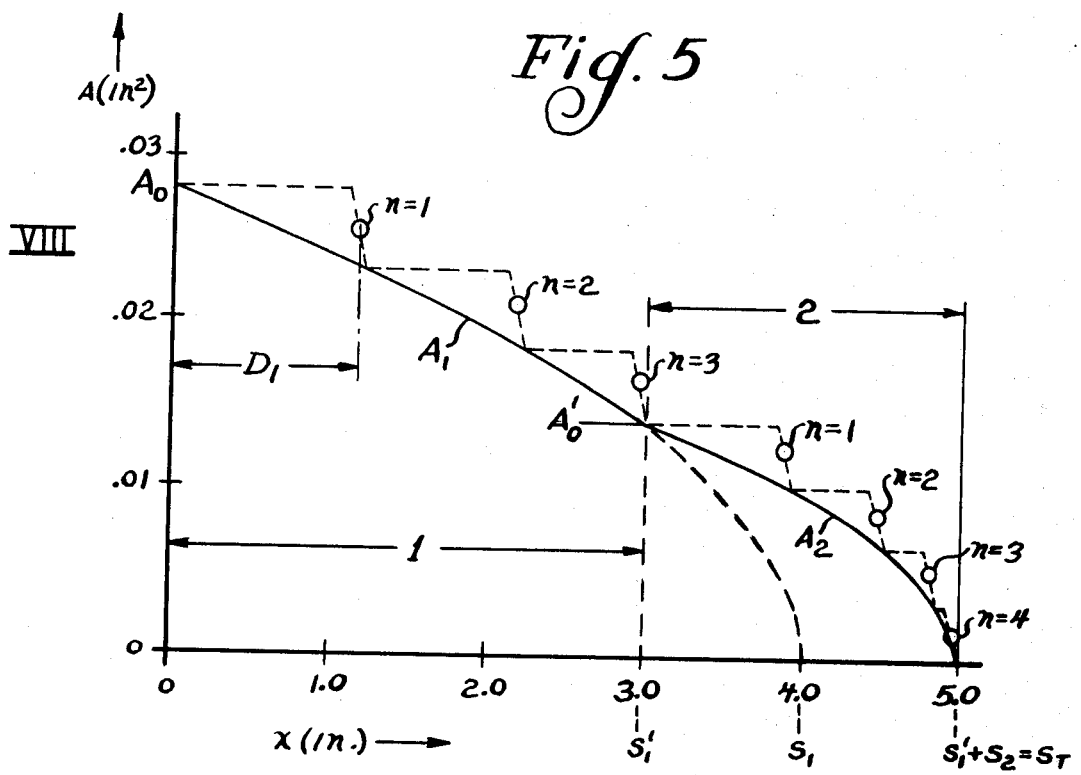
FIG. 5 is a calibrated Graph VIII of orifice area versus displacement for a pair of control regions corresponding to Example 1 in the following description, according to the invention.

The virtual stroke length $S_1$ associated with region 1 can be obtained from the formula, $S_1 = V_o^2/(2L)$. Eq. (11), where $S_1 = \frac{1}{3}$ ft. or 4 inches as shown in FIG. 5. Although region 1 is designed for constant deceleration of object 1, the truncation point $S'_1$, defining the extent of or length of region 1, is determined by finging the point at which object 2, separately impacting the shock absorber, would reach the deceleration limit L according to the following formula:

$$S_1' = S_1 \left[ 1 - \left( \frac{2m_2 S_1 L}{m_1 v_o^2} \right)^{m_2/(m_1-m_2)} \right] \quad \text{Eq. (12)}$$

Substituting the numerical values, $S'_1$ is ¼ ft. or 3 inches as shown in FIG. 5.

Next, the stroke $S_2$ of the second and last region must be determined. However, this cannot be done in the same manner that the virtual stroke $S_1$ associated with region 1 was determined since there is an unknown velocity to consider now. Thus, at $x = S'_{1'}$ the velocity of the second object after it has been decelerated through the first control region is determined according to the following formula:

$$v_2' = V_0 \left( 1 - \frac{S_1'}{S_1} \right)^{m_1/(2m_2)} \quad \text{Eq. (13)}$$

Substituting the numerical values, $v_2'$ at $x = S'_1$ (the beginning of the second control region) is 2.828 ft/sec. Since the deceleration limit is the same for the second body, the stroke in the second control region is: $S_2 = (v_2')^2/(2L)$. Eq.(14), where $S_2 = 1/6$ ft. or 2 inches, i.e., 3.0 to 5.0 inches as shown in FIG. 5. The entire stroke length of course is $s'_1 + S_2 = S_T$ or 5 inches.

Next, one must determine the values of $A_o$, the total orifice area available at the beginning of the stroke and $A_o'$, the total orifice area remaining at point $x = S'_1$. The formula for the orifice area as a function of displacement in the first control region is $$A_1 = V_0 \left( \frac{k_1}{m_1 L} \right)^{\frac{1}{2}} \left( 1 - \frac{x}{s_1} \right)^{\frac{1}{2}} \quad \text{Eq. (15)}$$

At $x = 0$, $A_1 = A_o$, and $_1$ is a constant based on the mass density of fluid, the area of the piston and the orifice coefficient of discharge. For a 2 inch bore shock absorber with hydraulic fluid of mass density 1.677 lb.-sec.$^2$/ft.$^4$ (slugs per cubic ft.), $k_1 = 1.777 \times 10^{-5}$ lb.-ft.$^2$-sec.$^2$. Substituting the numerical values, $A_o = 1.953 \times 10^{-4}$ ft.$^2$ or 0.02812 in.$^2$ as indicated in FIG. 5.

The formula for the orifice area in the second region is:

$$A_2 = v_2' \left( \frac{k_2}{m_2 L} \right)^{\frac{1}{2}} \left( 1 - \frac{x - s_1'}{S_2} \right)^{\frac{1}{2}} \quad \text{Eq. (16)}$$

where, $v_2'$ is the velocity of the second object at the start of the second control region and $k_2 = k_1$. At $x = S'_1$, $A_2 = A_o' = 9.764 \times 10^{-5}$ ft.$^2$ or 0.01406 inches$^2$, as indicated in FIG. 5.

Now that the orifice area profile versus displacement is known for Example 1, it must be implemented. This can be done directly with the metering pin embodiment of FIG. 2. To accomplish this, the orifice opening 24 in the piston 14' is sized in conjunction with coaxial metering pin 23 to provide a cylindrical orifice opening 24a which is equal to $A_o$ at position J. From position J, metering pin 23 must be tapered continuously to stroke termination position K to provide the reduction of orifice area required in accordance with the curve of FIG. 5. For example, at $x = S'_1$, the cylindrical orifice area remaining when the cross-sectional area of the pin at this location is subtracted from the cross-sectional area of orifice opening 24 in the face of piston 14' should be equal to $A_o'$.

Because of the increased structural requirements of the metering pin embodiment, it is preferred, however, to use a succession of holes through the cylinder wall as shown in FIG. 1 to approximate the continuous orifice area curve. To use discrete holes, the exact total number of holes and the precise diameter of each or the average diameter must be established. For example, in the system of FIG. 5, it is evident that half of the total orifice area is allocated to each control region. Thus, holes of the same diameter could be used and half of those holes allocated to one region and half to the other. If many regions are involved, the total orifice area at the beginning of each region will determine the proportion of the number of holes which are allocated to any given region. Given the orifice area for any region, the number of holes and their diameter for that region can be manipulated as desired. However, it is convenient to use the same diameter holes throughout any given region, although the diameter of the holes can vary from region to region.

The formula for the axial displacement, D, of each successive hole of diameter d in a given control region can be derived from Equation (9) as follows:

Let $X_T$ be represented by the total virtual stroke of each control region, $S_1$, $S_2$... etc. Let x be represented by D, the distance from the beginning of each control region to the $n^{th}$ hole of that control region. Let N be represented by $A_o$, the total orifice area required at the beginning of each control region or the remaining orifice area required at the beginning of each control region relative to a spaced hole orifice structure, wherein, $A_o = A_o$, $A'_o$, $A''_o$... etc., relative to each respective control region. Let n be represented by $n\pi d^2/4$, the area size of n holes of diameter d, where $n_1 \pi d^2 1/4$, $n_2 \pi d_2^2/4$, . . . etc., is representative of a specific control region.

Then from Eq.(9)

$$D_1 = S_1 \left[ 1 - \left( 1 - \frac{n_1 \pi d_1^2}{4 A_o} \right)^2 \right] - \frac{d_1}{2} \quad \text{Eq. (17)}$$

where subscript notations 1 represent references to control region 1 in Equation 17.

Arbitrarily using three holes of diameter 0.07721 inch with a virtual stroke of 4 inches for the first region, the displacement from $x = 0$ for the first three holes can be determined from the expression for D as 1.1836, 2.1836 and 2.9614, respectively.

The total orifice area for the second control region (i.e., $A_o'$) is 0.014046 inch. If a drill size of 0.06686 inch for the diameter of four holes is arbitrarily chosen for region No. 2, their displacements from the point $x = S'_1$ (the start of the second control region) are as follows: 0.8416, 1.4666, 1.8416, and 1.9666, respectively. This brings the axial separation between the last two holes in control region No. 2 to within 0.05814 inch. If this or any of the other axial separations are too close, the holes may be offset circumferentially.

EXAMPLE 2

In this example the shock absorber orifice structure according to the invention will be designed to handle four distinctively different load systems. To explain more clearly the significance placed on the intensity of these load systems, each rest mass selected will be motivated by one of the propelling forces common to the other. To further simplify the subscript notations used in identifying these mass sytems by the respective intensities, we will use the same impact velocity for all four load systems, and impose the same limiting deceleration rate restrictions upon them.

The following subscripted equations will be used to define and/or obtain the parameters of design required, that is, intensities, orifice area sizes, truncation locations, deceleration rates and velocities. Numerical values will not be obtained, but rather the equations will be written in general to relate to any number of different load systems that could have been selected to identify a given design range.

In the Glossary of Terms provided, and throughout the following equations, a notation is introduced which is meant to convey the process most clearly. For example, within the range of the first control region, $0 \leq x(i) \leq x(i,i') \leq x(1,1')$, i, and i' are used as locations of design reference, namely, the beginning or origin of each control region, and the termination or truncation location of each control region, respectively.

When x(i) is represented as x(1), x(1) is not necessarily x(i) evaluated at one point i=1, as in usual notation, but rather, x(i) is used to represent the displacement taken from an i location of design reference. For example, for any displacement in region $x(1,1') \leq x(i) \leq [X(1,1')+X(2,2')]$, x(i) may be represented as x(2), wherein, with reference to the i=1 location, x(2) would be equal to the extent x(1,1') and with reference to the i=2 location, x(2) may be equal to zero or the extent x(2,2') or obtain any value in between, where the extents of the control regions X(1,1') and X(2,2') may be represented as $\overline{X}(1)$ and $\overline{X}(2)$ for brevity, respectively.

Since the equivalent mass or intensity of a load system may vary from one location to another, Equation 1 given formerly will be expanded as follows:

$$M_{mnq}[X(i)] = \left\{ \frac{F_n[X(i)]}{a_{mnq}[X(i)]} + M_{mq}[X(i)] \right\} \quad \text{Eq. (18)}$$

The parameters of design in Equation 18 are expressed as functions of displacement X(i), and subscripts m-n-q are used as identifiers of mass, force, and velocity, respectively.

Since the deceleration rate $a_{mnq}(i)$, imposed upon an $M_{mnq}(i)$ or $M_{mq}(i)$ load system at the particular location i, is a function of the resistive force $F_B(i)$ encountered by the load system at this location, and $$F_B(i) = \frac{k(i) V^2_{mnq}(i)}{A^2_{mnq}(i)} \quad \text{Eq. (19)}$$

where the constant k(i) is some function of the mass density of the fluid, the orifice discharge coefficient, and the piston area of the shock absorber device, then at onset of impact or at the origin of the first control region i=1, the equivalent mass or intensity of any load system at this location can be obtained by the following equations:

$$M_{mnq}(i) = \frac{M_{mq}(i)}{\left[1 - \frac{F_n(i)}{F_B(i)}\right]} \quad \text{Eq. (20)}$$

or as $$M_{mnq}(i) = \frac{M_{mq}(i)}{\left[1 - \frac{F_n(i) A^2_{mnq}(i)}{k(i) V^2_{mnq}(i)}\right]} \quad \text{Eq. (21)}$$

where the resistive force $F_B(i)$ is proportional to the velocity squared of the fluid being forced or metered through the controling orifices, and thereby proportional to the velocity squared of the mass system or load system providing the momentum.

Now if we introduce a relative order number "c", wherein this order number is used in conjunction with an i location of design reference to identify the order of intensity of a particular $M_{mq}(i)$ or $M_{mnq}(i)$ load system, where the intensity of an $M_{mq}(i+c)$ or $M_{mnq}(i+c)$ load system is greater than the intensity of an $M_{mq}(i)$ or $M_{mnq}(i)$ load system at the i location of reference; wherein the order number "c" may take on integer values from c=1 to c=N−1, where N represents the total number of load systems considered within a given design range, wherein, the intensity of an $M_{mq}(i+1)$ or $M_{mnq}(i+1)$ load system is greater than the intensity of an $M_{mq}(i)$ or $M_{mnq}(i)$ load system, and the intensity of an $M_{mq}(i+2)$ or $M_{mnq}(i+2)$ load system is greater than the intensity of an $M_{mq}(i+1)$ or $M_{mnq}(i+1)$ load system, then the equations for deceleration, and velocity of these load systems are defined as follows:

$$a_{mnq}[X(i,i+c)] = \left\{ \frac{F_n[X(i+c)]}{M_{mq}(i+c) - M_{mnq}[X(i)]} - \right. \quad \text{Eq. (22)}$$

$$\left. B[X(i,i+c)] \left[ \frac{V^2_{mnq}(i,i+c)}{2S(i)} + \frac{F_n[X(i+c)]}{M_{mq}(i+c) - M_{mnq}[X(i)]} \right] \left[H[X(i)]\right]^\gamma \right\}$$

$$H[X(i)] = \left[1 - \frac{X(i)}{S(i)}\right] \quad \text{Eq. (23)}$$

$$B[X(i,i+c)] = \frac{M_{mnq}[X(i)]}{M_{mq}(i+c)} \quad \text{Eq. (24)}$$

$$B'[X(i,i+c)] = \frac{M_{mq}(i+c)}{M_{mnq}[X(i)] - M_{mq}(i+c)} \quad \text{Eq. (25)}$$

$$\gamma = \frac{1}{B'[X(i,i+c)]} \quad \text{Eq. (26)}$$

where notations (i,i+c) are relative placement identifiers used to position a particular $M_{mq}(i+c)$ or $M_{mnq}(i+c)$ load system at an i location of design reference and X(i,i+c) represents the relative displacement of a particular $M_{mq}(i+c)$ or $M_{mnq}(i+c)$ load system from an i location of design reference, and the parameters given in Equation 22 are defined as follows:

| | |
|---|---|
| $F_n[X(i+c)]$ | A force of n-magnitude acting on an $M_{mnq}(i+c)$ load system, expressed as a function of displacement of this load system |
| $M_{mq}(i+c)$ | The intensity of an $M_{mq}(i+c)$ load system |
| $M_{mnq}[X(i)]$ | The intensity of an $M_{mnq}(i)$ load system expressed as a function of displacement |

| | -continued |
|---|---|
| S(i) | X(i) The virtual stroke of an i location control region |
| $V_{mnq}(i, i + c)$ | The velocity of a particular $M_{mq}(i + c)$ or $M_{mnq}(i + c)$ load system at an i location of design reference |
| $a_{mnq}[X(i, i + c)]$ | The deceleration rate of a particular $M_{mq}(i + c)$ or $M_{mnq}(i + c)$ load system at an i location of design reference, expressed as a function of its relative displacment from this location |

Accordingly, $$A_{mnq}[X(i)] = A_{mnq}(i)\left[1 - \frac{X(i)}{S(i)}\right]^{\frac{1}{2}}\left[\frac{M_{mnq}(i)}{M_{mnq}[X(i)]}\right]^{\frac{1}{2}} \quad \text{Eq. (33)}$$

and when $M_{mnq}(i) = M_{mnq}[X(i)] =$ constant throughout a given control region, Equation 33 can be defined as an expansion of Equation 6, where $$A_{mnq}[X(i)] = A_{mnq}(i)\left[1 - \frac{X(i)}{S(i)}\right]^{\frac{1}{2}} \quad \text{Eq. (34)}$$

$$V_{mnq}[X(i,i+c)] = \left\{\left[V^2_{mnq}(i,i+c) + \frac{2F_n[X(i+c)]S(i)}{M_{mq}(i+c) - M_{mnq}[X(i)]}\right][H[X(i)]]\,B[X(i,i+c)] - \left[\frac{2F_n[X(i+c)]S(i)}{M_{mq}(i+c) - M_{mnq}[X(i)]}\right]H[X(i)]\right\}^{\frac{1}{2}} \quad \text{Eq. (27)}$$

where truncation locations S', referred to in Example 1, represent the shortest X[i,i+c] displacements. These displacements define the locations at which the $M_{mq}(i+c)$ or $M_{mnq}(i+c)$ load systems first reach their limiting deceleration rates $L_{mnq}(i+c)$. This relative displacement is measured from the origin i of an $M_{mq}(i)$ or $M_{mnq}(i)$ control region, and X[i,i+c] is defined as follows:

To avoid numeric computations, in Example 2, the $F_n(i)$, $F_B(i)$ and $M_{mq}(i)$ parameters will be given the following proportional magnitudes at the i=1 location of design reference:

| | |
|---|---|
| $M_{21}(1) =$ | $2M_{11}(1)$ |
| $F_2(1) =$ | $2F_1(1)$ |
| $F_B(1) =$ | $2F_2(1)$ |

$$X[i,i+c] = S(i)\left\{1 - \left[\frac{\frac{F_n[X(i+c)]}{M_{mnq}[X(i)] - M_{mq}(i+c)} - L_{mnq}(i+c)}{\frac{M_{mnq}[X(i)]F_n[X(i+c)]}{M_{mq}(i+c)M_{mnq}[X(i)] - M^2_{mq}(i+c)} - \frac{M_{mnq}[X(i)]V^2_{mnq}(i,i+c)}{2M_{mq}(i+c)S(i)}}\right]\right\}B'[X(i,i+c) \quad \text{Eq. (28)}$$

From Equation 2, $F_B(i)$ can be written as $$F_B(i) = M_{mnq}(i)a_{mnq}(i) \quad \text{Eq. (29)}$$

Then from Equation (19) and Equation (29)

$$A_{mnq}(i) = \left[\frac{k(i)}{M_{mnq}(i)a_{mnq}(i)}\right]^{\frac{1}{2}} V_{mnq}(i) \quad \text{Eq. (30)}$$

and expressing $A_{mnq}(i)$ as a function of displacement, Equation (30) can be written as $$A_{mnq}[X(i)] = \left[\frac{k[X(i)]}{M_{mnq}[X(i)]a_{mnq}[X(i)]}\right]^{\frac{1}{2}} V_{mnq}[X(i)] \quad \text{Eq. (31)}$$

Then for constant deceleration, when $a_{mnq}(i) = a_{mnq}[X(i)] =$ constant, and $k(i) = k[X(i)] =$ constant, from Equation (4) we get $$V_{mnq}[X(i)] = V_{mnq}(i)\left[1 - \frac{X(i)}{S(i)}\right]^{\frac{1}{2}} \quad \text{Eq. (32)}$$

Then from Equation (30) and Equation (31), $A_{mnq}[X(i)]$ can be defined as

Furthermore, in this example, the $F_n(i)$ forces motivating the mass systems will remain constant with respect to displacement, and each control region will be designed to maintain the deceleration rate of its respective load system constant throughout its extent, wherein, $$a_{mnq}(i) = a_{mnq}[X(i)] = L_{mnq}[X(i)], \text{ and } S(i) = \frac{V^2_{mnq}(i)}{2L_{mnq}[X(i)]} \quad \text{Eq. (35)}$$

Since $V_{mnq}(1)$ and $A_{mnq}(1)$ is common for the four load systems considered in this example, $F_B(1)$ will also be common, and the intensities of the $M_{mnq}(1)$ load systems can be established and defined at this i=1 location of design reference, with respect to the proportional magnitudes of the $M_{mq}(1)$ and $F_n(1)$ mass systems and motivating forces given, respectively.

From the $F_n(1)$, $F_B(1)$ and $M_{mq}(1)$ values given, and Equation (20) we can define the $M_{mnq}(1)$ load systems and order them, that is, from the lowest intensity first to the highest intensity last, as follows:

MATRIX 1
$$M_{mnq}(1) \begin{cases} M_{111}(1) = \left\{ \dfrac{F_1(1)}{L_{111}(1)} + M_{11}(1) \right\} \\ M_{121}(1) = \left\{ \dfrac{F_2(1)}{a_{121}(1)} + M_{11}(1) \right\} \\ M_{211}(1) = \left\{ \dfrac{F_1(1)}{a_{211}(1)} + M_{21}(1) \right\} \\ M_{221}(1) = \left\{ \dfrac{F_2(1)}{a_{221}(1)} + M_{21}(1) \right\} \end{cases}$$

where, $M_{111}(1) < M_{121}(1) < M_{211}(1) < M_{221}(1)$.

Note that for the $M_{111}(1)$ load system given in Matrix 1, the load system of lowest intensity, $a_{111}(1)$ is given as $L_{111}(1)$. This was done to indicate that control region 1, the extent of which will be defined as $X(1,1')$ or $\overline{X}(1)$ will be designed to maintain the deceleration rate of this load system constant at its limiting value $L_{111}(1)$, where $L_{111}(1) = L_{111}[X(1)]$. Therefore since $F_1(1) = F_1[X(1)] = $ constant, and $M_{11}(1) = M_{11}(2) = $ constant, that is $M_{mq}(i) = M_{mq}(i')$, from Equation 18 we find that $M_{111}(1) = M_{111}[X(1)] = $ constant, and that, at the $i' = 1'$ location (truncation point of control region 1), $$M_{111}(1') = M_{111}(2) = M_{111}(1)$$

that is, $M_{mnq}(i) = M_{mnq}(i')$ and from Equation (35)

$$S(1) = \dfrac{V^2_{111}(1)}{2L_{111}[X(1)]} \qquad \text{Eq. (36)}$$

From Matrix 1, relative to the "c" order number

MATRIX 2
$$M_{mnq}(1 + c) \begin{cases} M_{121}(1) = M_{121}(1 + 1) \text{ where } c = 1 \\ M_{111}(1) = M_{211}(1 + 2) \text{ where } c = 2 \\ M_{221}(1) = M_{221}(1 + 3) \text{ where } c = 3 \end{cases}$$

Then from Equation 28, we find that $X[1,1+1] = X[1,2] < X[1,3] < X[1,4]$ wherein the $M_{121}(1+1)$ load system reaches its limiting deceleration rate $L_{121}(2)$ before load systems $M_{211}(1+2)$ and $M_{221}(1+3)$.

The $X[1,2]$ displacement must therefore be used as the extent of control region 1 to insure that the $M_{121}[X(1)]$ load system does not exceed the limiting deceleration rate imposed upon it by design choice. Accordingly, $$X[1,2] = X[1,1'] = \overline{X}(1)$$

Since the extent of control region 1 defines the origin or beginning of control region 2, that is, the $i=2$ location of design reference, we can establish the intensities of all subsequent load systems at this location of design reference by use of Equations 18, 22 and 27 and order them from the lowest intensity to the highest intensity as follows:

MATRIX 3
$$M_{mnq}(2) \begin{cases} M_{121}(2) = \left\{ \dfrac{F_2(2)}{L_{121}(2)} + M_{11}(2) \right\} \\ M_{211}(2) = \left\{ \dfrac{F_1(2)}{a_{211}(2)} + M_{21}(2) \right\} \\ M_{221}(2) = \left\{ \dfrac{F_2(2)}{a_{221}(2)} + M_{21}(2) \right\} \end{cases}$$

Although the limiting deceleration rates $L_{111}(2)$ and $L_{121}(2)$ are common for both load system 1 and load system 2, respectively, that is, $L_{111}(2) = L_{121}(2)$, and rest mass system $M_{11}(1)$ remains constant, that is $M_{11}(1) = M_{11}(2) = M_{11}(3) \ldots$ etc., in that $F_2(2) > F_1(2)$ and $M_{111}(2) = M_{111}(1)$, the intensity of load system 2, at the $i=2$ location of design reference, must be greater than the intensity of load system 1 at this location, that is, $M_{121}(2) > M_{111}(2)$.

If control region 2 is designed to maintain the deceleration rate of the $M_{121}(2)$ load system constant at the limiting value $L_{121}(2)$, throughout the $\overline{X}(2)$ extent of this control region, wherein $M_{121}[X(2)]$ also remains constant throughout this extent, that is $M_{121}(2') = M_{121}(3) = M_{121}(2)$, then from Matrix 3, relative to the "c" order number system adopted MATRIX 4
$$M_{mnq}(2 + c) \begin{cases} M_{211}(2) = M_{211}(2 + 1) \text{ where } c = 1 \\ M_{221}(2) = M_{221}(2 + 2) \text{ where } c = 2 \end{cases}$$

Then from Matrix 3 and Matrix 4, for $M_{mnq}(2) = M_{121}(2) = M_{121}[X(2)]$, $M_{mq}(i+c) = M_{2-1}(i+c) = M_{21}(2+2) = M_{21}(2)$ and $F_n[X(i+c)] = F_2[X(i+c)] = F_2[X(2+2)] = F_2(2)$, and from Equation 28, after finding $V^2_{mnq}(i,i+c) = V^2_{22-1}(i,i+c) = V^2_{221}(2,2+2)$ and from Equation 27, wherein $V_{221}(2,2+2)$ is obtained as $V_{221}[X(1,1+3)]$ evaluated at $X(i) = \overline{X}(1)$, that is, $V_{221}[X(1,1+3)] = V_{221}(2,2+2) = V_{221}(2)$ at $X(1) = \overline{X}(1)$, we find that $$X[2,2+2] = X[2,4] < X[2,3]$$

wherein the $M_{221}(2+2)$ load system reaches its limiting deceleration rate $L_{221}(3)$ before load system $M_{211}(2+1)$. Therefore, the intensity of the $M_{211}(2+1)$ load system at this location, $M_{211}(3)$, becomes superfluous. This being justified in that any expansion of the existing orifice area from this location, having a decay rate predicated upon a load system of higher intensity, will contain the momentum of load system 3 below its limiting change level. The $X[2,4]$ displacement must therefore be used as the extent of control region 2 to insure that load system $M_{221}[X(2)]$ does not exceed its limiting deceleration rate $L_{221}(3)$. Accordingly, $$X[2,4] = X[2,2'] = \overline{X}(2)$$

and $$S(2) = \dfrac{V^2_{121}(2)}{2L_{121}[X(2)]} \qquad \text{Eq. (37)}$$

The $V_{121}(2)$ velocity of load system 2 can be obtained by Equation 27, where $V_{121}(2) = V_{121}[X(1,1+1)]$ evaluated at $X(1) = \overline{X}(1)$, wherein $V_{mnq}(i,i+c) = V_{121}(1,1+1) = V_{121}(1)$,
$F_n[X(i+c)] = F_2[X(1+1)] = F_2(1)$,
$M_{mq}(i+c) = M_{11}(1+1) = M_{11}(1)$  and
$M_{mnq}[X(i)] = M_{111}[X(1)] = M_{111}(1)$.

Since the extent of control region 2 defines the origin or beginning of control region 3, that is, the i=3 location of design reference, and there are no subsequent load systems of higher intensity then the $M_{221}(3)$ load system at this location, wherein $a_{221}(3) = L_{221}(3)$, $F_2(3) = F_2(2)$, and $M_{21}(3) = M_{21}(2)$, control region 3 is designed for load system 4, that is, load system 4 is now defined as $M_{mnq}(3)$, where

MATRIX 5

$$M_{mnq}(3)\left\{M_{221}(3) = \left(\frac{F_2(3)}{L_{221}(3)} + M_{21}(3)\right)\right\}$$

Therefore, the last control region, control region 3, is designed to maintain the deceleration rate of the $M_{221}(3)$ load system constant at the limiting value $L_{221}(3)$, throughout the $\overline{X}(3)$ extent of this control region, wherein, $\overline{X}(3) = S(3)$. Therefore, $$M_{221}(3') = M_{221}(4) = M_{221}(3) = M_{221}[X(3)] \text{ and} \quad \text{Eq. (38)}$$

$$S(3) = \frac{V^2_{221}(3)}{2L_{221}(3)}$$

The $V_{221}(3)$ velocity of load system 4 ($M_{221}(3)$), can be obtained by Equation 27, where $V_{221}(3) = V_{221}[X(2,2+2)]$ evaluated at $X(2) = \overline{X}(2)$, wherein $V_{mnq}(i,i+c) = V_{221}(2,2+2) = V_{221}(2)$, $F_n[X(i+c)] = F_2[X(2+2)] = F_2(2)$,
$M_{mq}(i+c) = M_{21}(2+2) = M_{21}(2)$,  and
$M_{mnq}[X(i)] = M_{121}[X(2)] = M_{121}(2)$.

Now that we have established and defined these load systems, and established that the intensities of the load systems will remain constant throughout their respective control regions, relative to the parameters of design selected in this example, we can identify these load systems in relation to their respective control regions and order of intensities as follows:

MATRIX 6

$$M_{mnq}[X(i,i')]\begin{cases} M_{111}[X(1,1')] = \left\{\dfrac{F_1\overline{X}(1)}{L_{111}[X(1)]} + M_{11}[\overline{X}(1)]\right\} \\ M_{121}[X(2,2')] = \left\{\dfrac{F_2\overline{X}(2)}{L_{121}[\overline{X}(2)]} + M_{11}[\overline{X}(2)]\right\} \\ M_{221}[X(3,3')] = \left\{\dfrac{F_2\overline{X}(3)}{L_{221}[\overline{X}(3)]} + M_{21}[\overline{X}(3)]\right\} \end{cases}$$

where $\overline{X}(i) = X(i,i')$, and $$S_T = X(1,1') + X(2,2') + X(3,3') \quad \text{Eq. (39)}$$

or $$S_T = \overline{X}(1) + \overline{X}(2) + S(3) \quad \text{Eq. (40)}$$

where $\overline{X}(3) = S(3)$.

For Example 2, since $M_{mnq}(i) = M_{mnq}[\overline{X}(i)] = M_{mnq}[X(1)]$, wherein $M_{mnq}[X(i)]$ remains constant throughout the $\overline{X}(i)$ extent of its respective control region, Equation 33 can be evaluated as follows:

| For i = 1, and $0 \leq X(i) \leq X(1,1') = \overline{X}(1)$: | | |
|---|---|---|
| $A_{111}[X(1)] = \left[\dfrac{k(1)}{M_{111}(1)L_{111}(1)}\right]^{\frac{1}{2}} V_{111}(1)\left[1 - \dfrac{X(1)}{S(1)}\right]^{\frac{1}{2}}$ | | Eq. (41) |
| X(1) | $A_{111}[X(1)]$ | |
| 0 | where in Equation 41, X(1) = 0 | |
| $\underline{1}$ | where in Equation 41, X(1) = $\underline{1}$ | |
| $\overline{X}(1)$ | where in Equation 41, X(1) = X(1). | |

| For i = 2, and $X(1) \leq X(i) \leq [X(1,1') + X(2,2')] = [\overline{X}(1) + \overline{X}(2)]$: | | |
|---|---|---|
| $A_{121}[X(2)] = \left[\dfrac{k(2)}{M_{121}(2)L_{121}(2)}\right]^{\frac{1}{2}} V_{121}(2)\left[1 - \dfrac{X(2)}{S(2)}\right]^{\frac{1}{2}}$ | | Eq. (42) |
| $[X(i) - \overline{X}(1)] = X(2)$ | $A_{121}[X(2)]$ | |
| 0 | where in Equation 42, X(2) = 0 | |
| $\underline{1}$ | where in Equation 42, X(2) = $\underline{1}$ | |
| $\overline{X}(2)$ | where in Equation 42, X(2) = X(2) | |

| For i = 3, and $[\overline{X}(1) + \overline{X}(2)] \leq X(i) \leq ]X(2,2') + X(3,3') = [\overline{X}(1) + \overline{X}(2) + X(3)]$: | | |
|---|---|---|
| $A_{221}[X(3)] = \left[\dfrac{k(3)}{M_{221}(3)L_{221}(3)}\right]^{\frac{1}{2}} V_{221}(3)\left[1 - \dfrac{X(3)}{S(3)}\right]^{\frac{1}{2}}$ | | Eq. (43) |
| $[X(i) - \overline{X}(1) - \overline{X}(2)] = $ where $A_{221}[X(3)]$ | | |
| 0 | Where in Equation 43, X(3) = 0 | |
| $\underline{1}$ | where in Equation 43, X(3) = $\underline{1}$ | |
| $\overline{X}(3)$ | where in Equation 43, X(3) = X(3) | |

Figure 6:
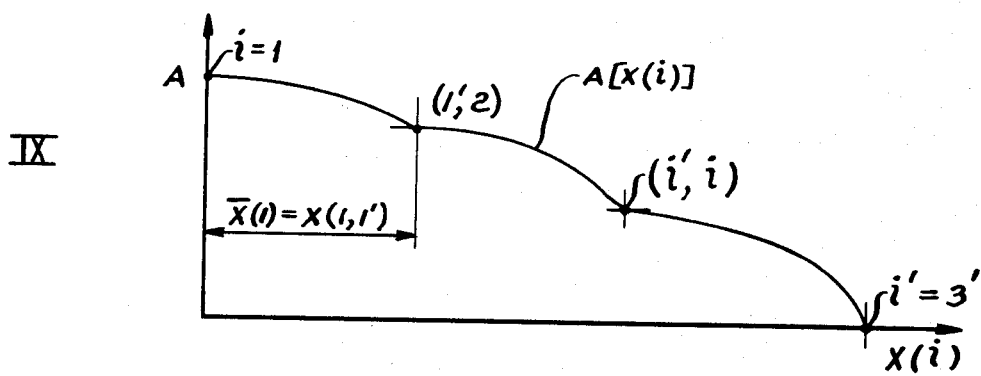
FIG. 6 is a Graph IX of orifice area versus displacement for four different load systems, showing control regions corresponding to Example 2 in the following description, according to the invention.

Now that all the pertinent data has been obtained, the orifice area pattern can be represented graphically as illustrated in FIG. 6.

Then if Equation 17 is expanded to represent the axial displacement "D" as a function of two variables, location i, and displacement X(i), relative to the equations given, the location of orifice holes in a spaced hole device of this invention can be determined independently for each control region as follows:

$$D[i,X(i)] = S(i)\left\{1 - \left[1 - \frac{\pi d^2(i)n(i)}{4A[X(i)]}\right]^2\right\} - \frac{d(i)}{2} \quad \text{Eq. (44)}$$

where A[X(i)] represents the total remaining orifice area expressed as a function of displacement X(i) from a given i location of design reference, n(i) represents the $n^{th}$ orifice hole of the given i location control region, wherein, n(i)=1, 2, 3, ... N(i), where N(i) represents the total number of orifice holes used in the given i location control region, where S(i) represents the total virtual stroke of the given i location control region, and d(i) represents the size of orifice holes used in the given i location control region, wherein all N(i) orifice holes within the given control region are of the same d(i) size.

For example, with reference to FIG. 5 of Example 1, for i=1, X(i)=X(1)=0, A[X(i)]=A[X(1)]=A[0]=0.02812 in.$^2$, N(i)=N(1)=3, d(i)=d(1)=0.07721 in., and S(i)=S(1)=4.0 in., with respect to control region 1, Equation 44 becomes $$D[1,X(1)] = S(1)\left\{1 - \left[1 - \frac{\pi d^2(1)n(1)}{4A[o]}\right]^2\right\} - \frac{d(1)}{2} \quad \text{Eq. (45)}$$

and for

| n(1) | D[1,X(1)1 ]~ in. |
|---|---|
| 1 | 1.1836 |
| 2 | 2.1836 |
| 3 | 2.9614 |

Based on the foregoing disclosure, and the aspect of practicality and manufacturing economics, it has been established that a device of this invention, having a total displacement stroke of 6.0 inches, can be manufactured to control as few as two distinctively different load systems and as many as 64 distinctively different load systems. Further, a device of this invention having a greater displacement can be economically manufactured to control a greater number of distinctively different load systems.

The shock absorber system described herein accomplishes deceleration control over a wide range of distinctively different load systems, wherein each load system is defined by its rest mass, velocity, limiting deceleration rate, and propelling force, wherein when in effect, such propelling forces may vary or remain constant. Without any adjustment mechanism, this type of shock absorber provides individual deceleration control, and total arrestment for all load systems considered within the scope of its design range, wherein these load systems may be constant intensity load systems or load systems of varying intensity, and accomplishes this most efficiently by utilizing the full displacement stroke of the device for the arrestment of each load system. Thus, the self-adjusting shock absorber described herein provides proportional stopping forces: low stopping forces for low momentum load systems and higher stopping forces for higher momentum load systems. The self-adjusting shock absorber can also accommodate intermediate load systems, that is, load systems not specifically accounted for but whose intensity lies between minimum and maximum design values when the impact velocities of such intermediate load systems fall within the design range.

Because the system does not require adjustment mechanisms for varying the orifice area, the shock absorber's performance stability relative to temperature is increased because there is no inherent leakage. The installation time is reduced since there is no need for trial runs and adjustments, so long as the loads to be decelerated are known to be within the wide design range. Since the shock absorber has already been designed to handle a wide range of load intensities, the guesswork is taken out of load system deceleration control.

| GLOSSARY OF TERMS | |
|---|---|
| Rest Mass | Body at rest or having no motion |
| Mass System or Load System | Body in motion with or without external force applied |
| Equivalent Mass | A measure of force relative to motion, or a measure of mass relative to motion, or a measure of force and mass relative to motion |
| Intensity | A measure of the equivalent mass of a load system relative to its existing state, wherein the measure may vary with respect to time and place |
| Equivalent Mass System or Load System | an equivalent mass, as defined above, with or without external forces applied |
| Potential | The ability to do work |
| Potential Energy | A state of energy that has the ability to do work |
| Potential State | A specific state of energy measured with respect to location, displacement and time |
| Total Energy State | A specific state of one or more forms of energy, such as potential energy, and kinetic energy, measured with respect to location, displacement and time |
| Kinetic Energy | The energy of a body in motion |
| Limiting Deceleration Rate | The deceleration rate imposed upon an $M_{mq}$ or an $M_{mnq}$ mass system or equivalent mass system, by design choice, which may not be exceeded |
| $M_m$ | Rest mass of m-magnitude measured in the FT-LB-SEC system |
| $M_{mq}$ | Mass system or equivalent mass system of |

-continued

GLOSSARY OF TERMS

| | |
|---|---|
| | magnitude-m, having a finite velocity of magnitude-q, wherein, the magnitude of the mass or the equivalent mass of this system is measured in the FT-LB-SEC system |
| $M_{mnq}$ | Mass system or equivalent mass system composed of a rest mass of m-magnitude, having a applied force of n-magnitude; wherein, the rest mass and applied force have a common velocity of q-magnitude; wherein, the magnitude of the mass or the equivalent mass of the combined system is measured in the FT-LB-SEC system |
| $M_m(i)$ | Rest mass of m-magnitude, wherein the magnitude of the rest mass is measured at the specific location (i) in FT-LB-SEC system |
| $M_m[X(i)]$ | Rest mass of m-magnitude expressed as a function of displacement X(i), wherein, the magnitude of the rest mass, measured at the specific location (i), remains constant with respect to displacement X(i), wherein the magnitude of the rest mass is measured in the FT-LB-SEC system |
| $M_{mq}(i)$ | Mass system or equivalent mass system, wherein the magnitude of the mass of this system is measured at the specific location (i) in the FT-LB-SEC system |
| $M_{mq}[X(i)]$ | Mass system or equivalent mass system, expressed as a function of displacement X(i), wherein, the magnitude of mass or equivalent mass of this system, measured at the specific location (i), may vary or remain constant with respect to displacement X(i), wherein the magnitude of the mass or the equivalent mass of this system is measured in the FT-LB-SEC system |
| $M_{mnq}(i)$ | Mass system or equivalent mass system, wherein the magnitude of the mass of this system is measured at the specific location (i) in the FT-LB-SEC system |
| $M_{mnq}[X(i)]$ | Mass system or equivalent mass system expressed as a function of displacement X(i), wherein, the magnitude of mass or the equivalent mass of this system, measured at the specific location (i), may vary or remain constant with respect to displacement X(i), wherein, the magnitude of the mass or the equivalent mass of this system is measured in the FT-LB-SEC system |
| $V_q$ | A velocity of q-magnitude measured in the FT-SEC system |
| $V_q(i)$ | A velocity of q-magnitude, wherein the magnitude of velocity is measured at the specific location (i) in the FT-SEC system |
| $V_q[X(i)]$ | A velocity of q-magnitude expressed as a function of displacement X(i), wherein, the magnitude of velocity, measured at the specific location (i), may vary or remain constant with respect to displacement X(i), wherein, the magnitude of velocity is measured in the FT-SEC system |
| $V_{mnq}[X(i)]$ | The velocity of an $M_{mq}$ or an $M_{mnq}$ mass system or equivalent mass system expressed as a function of displacement X(i), wherein, the magnitude of velocity of the $M_{mq}$ or $M_{mnq}$ mass system or equivalent mass system, measured at the specific location (i), may vary or remain constant with respect to displacement X(i), wherein, the magnitude of velocity is measured in the FT-SEC system |
| $a_{mnq}(i)$ | The deceleration rate of an $M_{mq}$ or an $M_{mnq}$ mass system or equivalent mass system, wherein the magnitude of the deceleration rate of the $M_{mq}$ or $M_{mnq}$ mass system or equivalent mass system is measured at the specific location (i) in the FT-SEC system |
| $a_{mnq}[X(i)]$ | The deceleration rate of an $M_{mq}$ or an $M_{mnq}$ mass system or equivalent mass system expressed as a function of displacement X(i), wherein, the magnitude of the deceleration rate of the $M_{mq}$ or $M_{mnq}$ mass system or |

GLOSSARY OF TERMS (-continued)

| | |
|---|---|
| | equivalent mass system, measured at the specific location (i), may vary or remain constant with respect to displacement X(i), wherein, the magnitude of the deceleration rate is measured in the FT-SEC system |
| $L_{mnq}(i)$ | The limiting deceleration rate imposed upon an $M_{mq}$ or an $M_{mnq}$ mass system or equivalent mass system, wherein the magnitude of the limiting deceleration rate imposed is measured at the specific location (i) in the FT-SEC system |
| $L_{mnq}[X(i)]$ | The limiting deceleration rate imposed upon an $M_{mq}$ or an $M_{mnq}$ mass system or equivalent mass system, expressed as a function of displacement X(i), wherein, the magnitude of the limiting deceleration rate imposed upon the $M_{mg}$ or $M_{mnq}$ mass system or equivalent mass system, measured at the specific location (i), may vary or remain constant with respect to displacement X(i), wherein, the magnitude of the limiting deceleration rate is measured in the FT-SEC system |
| $F_n$ | A force of magnitude-n, measured in the LBS-force system |
| $F_n(i)$ | A force of n-magnitude, wherein the magnitude of force is measured at the specific location (i) in the LBS-force system |
| $F_n[X(i)]$ | A force of n-magnitude, expressed as a function of displacement X(i), wherein, the magnitude of force, measured at the specific location (i), may vary or remain constant with respect to displacement X(i), wherein, the magnitude of force is measured in the LBS-force system |
| (i) = i | A location of design reference established by a particular $M_{mq}$ or $M_{mnq}$ mass system or equivalent mass system; wherein, this $M_{mq}$ or $M_{mnq}$ mass system or equivalent mass system has reached its limiting deceleration rate at this location; wherein, upon reaching its limiting deceleration rate, this mass system or equivalent mass system can be defined at this location as an $M_{mq}(i)$ or $M_{mnq}(i)$ design mass system or equivalent design mass system; wherein, the specific location or design reference can be used to identify this design mass system or equivalent design mass system; wherein, this specific location of design reference can also be considered a location of common reference for all mass systems or equivalent mass systems considered |
| X(i) | A displacement from an i location of design reference |
| $\overline{X(i)}$ | The extent of an X(i) displacement, measured from an i location of design reference |
| (i)' = i' | A location of design reference established by a particular $M_{mq}(i + c)$ or $M_{mnq}(i + c)$ mass system or equivalent mass system, wherein this mass system or equivalent mass system has reached its limiting deceleration rate at this location within the shortest X(i) displacement; wherein, the X(i) extent X(i,i') of this displacement defines the respective (i,i') control region; wherein, this $M_{mq}(i + c)$ or $M_{mnq}(i + c)$ mass system or equivalent mass system can be redefined at this (i)' location as an $M_{mq}(i)$ or M hd mnq(i) design mass system or equivalent design mass system |
| (i,i') | Locations of design reference used to identify the control region established for an $M_{mq}(i)$ or $M_{mnq}(i)$ design mass system or equivalent design mass system |
| X(i,i') | The design extent of an X(i) displacement, bounded by two locations of design reference, which is used to define the extent of an (i,i') control region, wherein, a specific X(i,i') extent can be used to identify a specific $M_{mq}(i)$ or $M_{mnq}(i)$ design mass |

| | -continued |
|---|---|
| | GLOSSARY OF TERMS |
| | system or equivalent design mass system with reference to an ordering matrix; wherein, the ordering matrix is used to define all design mass systems or equivalent design mass systems in the ordering sequence established for them |
| c | A relative order number used in conjunction with an (i) location of design reference to identify a particular mass system or equivalent mass system with respect to its ordered location from an $M_{mq}(i)$ or $M_{mnq}(i)$ design mass system or equivalent design mass system, wherein, the design mass system or equivalent design mass system has been defined by an ordering matrix; wherein, the ordering matrix is established to define the relative order of all mass systems or equivalent mass systems at a common location of design reference (i); wherein, the ordering matrix is also established to define the relative order of all design mass systems or equivalent design mass systems with respect to all (i) locations of design reference, and wherein, this relative order number "c" may take on integer values from c = 1 to c = N − 1 |
| (i + c) | A random combination number used to identify a particular $M_{mq}(i+c)$ or $M_{mnq}(i+c)$ mass system or equivalent mass system with respect to its ordered location from an $M_{mq}(i)$ or $M_{mnq}(i)$ design mass system or equivalent design mass system, wherein, the design mass system or equivalent design mass system has been defined by an ordering matrix, wherein, the $M_{mq}(i+c)$ or $M_{mnq}(i+c)$ mass system or equivalent mass system is larger than an $M_{mq}(i)$ or $M_{mbq}(i)$ design mass system or equivalent design mass system, and larger than or equal to an $M_{mq}(i+1)$ or $M_{mnq}(i+1)$ mass system or equivalent mass system |
| $M_{mq}(i + c)$ | A particular mass system or equivalent mass system identifiable with respect to its ordered location from an $M_{mq}(i)$ or $M_{mnq}(i)$ design mass system or equivalent design mass system, wherein, the design mass system or equivalent desgin mass system has been defined by an ordering matrix |
| $M_{mnq}(i + c)$ | Same as for $M_{mq}(i + c)$ |
| $M_{mq}(i + 1)$ | A particular mass system or equivalent mass system identifiable with respect to its ordered location from an $M_{mq}(i)$ or $M_{mnq}(i)$ design mass system or equivalent design mass system, wherein, the design mass system or equivalent design mass system has been defined by an ordering matrix; wherein, the $M_{mq}(i+1)$ or $M_{mnq}(i+1)$ mass system or equivalent mass system is the closest larger mass system or equivalent mass system to an $M_{mq}(i)$ or $M_{mnq}(i)$ design mass system or equivalent design mass system, and wherein, an $M_{mq}(i+2)$ or $M_{mnq}(i+2)$ mass system or equivalent mass system is the next closest larger mass system or equivalent mass system etc. |
| X(i + c) | A reference displacement, used in general to represent the displacement of an $M_{mq}(i+c)$ or $M_{mnq}(i+c)$ mass system or equivalent mass system |
| (i,i + c) | A relative location placement identifier, used to position a particular $M_{mq}(i+c)$ or $M_{mnq}(i+c)$ mass system or equivalent mass system at an (i) location of design reference |
| $V_{mnq}(i,i + c)$ | The velocity of a particular $M_{mq}(i+c)$ or $M_{mnq}(i+c)$ mass system or equivalent mass system at an (i) location of design referene |
| X(i,i + c) | The relative displacement of a particular $M_{mq}(i+c)$ or $M_{mnq}(i+c)$ mass system or |

-continued

GLOSSARY OF TERMS

| | |
|---|---|
| | equivalent mass system from an (i) location of design reference |
| $V_{mnq}[X(i,i+c)]$ | The velocity of a particular $M_{mq}(i+c)$ or $M_{mnq}(i+c)$ mass system or equivalent mass system at an (i) location of design reference, expressed as a function of its relative displacement from this (i) location of design reference |
| $S(i)$ | The $X(i)$ displacement progression required to generate a complete i location control region, that is, the total virtual stroke of the control region |
| $H[X(i)]$ | A dimensionless displacement ratio used to define parametric variations |

I claim:

1. A shock absorber for decelerating impacting loads, said shock absorber being of the type comprising a closed hydraulic cylinder, a piston in said cylinder having a predetermined stroke from an initial position to a final position therein, and fluid passageway means for discharging fluid from the portion of the cylinder ahead of the piston as the piston moves away from its initial position in response to an impacting load, said passageway means having means for controlling the fluid discharge rate as a function of piston displacement from said initial position, wherein the improvement comprises:

said controlling means providing a progressively diminishing fluid discharge rate as a function of said piston displacement as said piston traverses a predefined portion of its stroke, defining a control region, to approximate a predetermined deceleration profile for one nominal design mass system, and providing a progressively diminishing fluid discharge rate as a function of said piston displacement as said piston traverses another predefined portion of its stroke, defining another control region, to approximate a predetermined deceleration profile for another nominal design mass system characterized at its point of impact, and thereafter in the case of an applied propelling force, as different from said one mass system in that its mass, velocity and propelling force defining an equivalent mass system is substantially different from that of said one mass system at its point of impact.

2. The shock absorber as set forth in claim 1, wherein said predefined portions of said stroke correspond to the initial portion and the final portion of said stroke, respectively, the mass system with respect to which the controlling means provides a predetermined deceleration profile in the initial portion of said stroke having a minimum intensity among a plurality of mass systems in a design range to which said shock absorber is subjected and the mass system with respect to which said controlling means provides a predetermined deceleration profile in the final portion of said stroke having a maximum intensity among said plurality of mass systems.

3. The shock absorber as set forth in claim 1 or 2, wherein said predetermined deceleration profile is a constant level of deceleration.

4. The shock absorber of claim 1, wherein said predefined portions of said stroke are consecutive adjacent portions of said stroke such that the respective control regions are consecutively continuous.

5. The shock absorber of claim 4, wherein the end of the first one of said consecutive control regions is determined as the point at which a predetermined level is obtained for the first time in the deceleration of an object for which the next control region is designed to provide said predetermined deceleration profile.

6. The shock absorber of claim 1, wherein the relationship between the fluid discharge rate and piston displacement throughout each of said control regions is determined in accordance with the velocity at the beginning of the respective control region of an object which at its point of impact, and thereafter in the case of an applied propelling force, had the respective equivalent mass for which said control region provides a predetermined deceleration profile.

7. The shock absorber as set forth in claim 1, wherein said controlling means includes orifice means for progressively diminishing the orifice area for fluid discharge with respect to each control region, the approximate decay rate of the orifice area as a function of piston displacement being different at the end of said one control region from that at the beginning of another control region.

8. The shock absorber as set forth in claim 7, wherein said orifice means provides an exponentially decaying orifice area with piston displacement in a given control region.

9. The shock absorber as set forth in claim 7, wherein said orifice means includes a plurality of axially spaced discharge ports through said cylinder.

10. The shock absorber as set forth in claim 9, wherein said discharge ports corresponding to a given control region are axially spaced over the corresponding portion of the stroke.

11. The shock absorber as set forth in claim 10, wherein for a given control region, said fluid discharge ports each provide the same rate of discharge, the decay rate of the orifice area being provided by a progressively closer axial spacing of said discharge ports in a direction toward said final position of said piston.

12. The shock absorber as set forth in claim 11, wherein the discharge rate of the individual discharge ports in one of said control regions differs from the fluid discharge rate of the individual discharge ports in another control region.

13. The shock absorber as set forth in claim 7, wherein said orifice means includes metering means, having means for approximately parabolically decreasing the total orifice area for fluid discharge from the cylinder with respect to piston displacement in a given control region.

14. The shock absorber as set forth in claim 13, wherein said control regions are consecutive and correspond to first and second adjacent portions of said stroke, said orifice means terminating the preceding approximately parabolic relationship between the rate of orifice area decay and piston displacement at a truncation point between said first and second control regions, such that a new parabolic relationship with a slower initial rate of orifice area decay with respect to piston displacement than the immediately preceding rate is begun in the second control region.

15. The shock absorber as set forth in claim 7 wherein said orifice means includes a fluid discharge orifice and a metering pin of progressively diminishing cross-section having an end of smaller cross-section which is received in said orifice, and means for advancing said pin axially through said orifice with increasing piston displacement from said initial position such that more and more of said orifice is obstructed by said pin, whereby the orifice area for fluid discharge from the cylinder is progressively diminished over the stroke of the piston.

16. A shock absorber for decelerating objects impinging thereagainst, said shock absorber being of the type comprising a hydraulic cylinder, a piston in said cylinder and having a predetermined stroke therein from a first position adjacent one end of the cylinder to a second position adjacent the other end of the cylinder, a piston rod extending externally of said cylinder from said piston, means resiliently biasing said piston to said first position, a hydraulic reservoir and fluid passageway means from the cylinder to the reservoir through which the hydraulic fluid in the cylinder flows to the reservoir when the piston moves toward the second position in response to a shock force to be absorbed being applied to the piston, said passageway means having orifice means therein for controlling the rate of flow of hydraulic fluid to the reservoir and thereby establishing the resistance of the shock absorber to shock forces, said orifice means providing different rates of flow for different parts of the stroke of the piston as it moves from said first position to said second position, said shock absorber being subjected to shock forces consisting of a plurality of different equivalent mass systems including a maximum mass system and a minimum mass system, said shock absorber being characterized by:

said orifice means establishing a rate of flow to the reservoir, for an initial part of said stroke as said piston moves away from said first position, such that there is a constant deceleration of the object associated with the minimum mass system during said initial part of the stroke, and establishing a rate of flow to the reservoir, for a final part of said stroke as said piston moves to the second position, such that there is a constant deceleration of the object associated with the maximum mass system during said final part of the stroke.

* * * * *

UNITED STATES PATENT AND TRADEMARK OFFICE
CERTIFICATE OF CORRECTION

Page 1 of 3

PATENT NO. : 4,284,177
DATED : August 18, 1981
INVENTOR(S) : John A. Domek

It is certified that error appears in the above-identified patent and that said Letters Patent are hereby corrected as shown below:

On The Title Page, in the ABSTRACT, l. 8 "orifice are a" should be --orifice area--
Col. 6, l. 53 "a(X)" should be --a(x)--
Col. 10, l. 64 "$S_1$" should be --$S'_1$--
Col. 11, l. 38 "and $_1$ is a constant" should be --and $k_1$ is a constant--
Col. 17, l. 43 In MATRIX 2 "$M_{111}(1) = M_{211}$" should be --$M_{211}(1) = M_{211}$--

Col. 20, under MATRIX 6, the numerators of each of the three fractions shown, lines 10-18, should be corrected by inserting a bracket ([) as follows:

UNITED STATES PATENT AND TRADEMARK OFFICE
CERTIFICATE OF CORRECTION

PATENT NO. : 4,284,177

DATED : August 18, 1981

INVENTOR(S) : John A. Domek

It is certified that error appears in the above-identified patent and that said Letters Patent are hereby corrected as shown below:

"$F_1 \bar{X}(1)]$" should be --$F_1[\bar{X}(1)]$--

"$F_2 \bar{X}(2)]$" should be --$F_2[\bar{X}(2)]$--

"$F_2 \bar{X}(3)]$" should be --$F_2[\bar{X}(3)]$--

Col. 20, ls. 29,30 "since $M_{mnq}(i) = M_{mnq}[\bar{X}(i)]$" should be --since $M_{mnq}(i) = M_{mnq}[X(i)]$--

Col. 20, l. 55 after "$X(i) \leq$ ", delete "]" and insert --$[X(1,1')+$--

UNITED STATES PATENT AND TRADEMARK OFFICE
CERTIFICATE OF CORRECTION

PATENT NO. : 4,284,177
DATED : August 18, 1981
INVENTOR(S) : John A. Domek

It is certified that error appears in the above-identified patent and that said Letters Patent are hereby corrected as shown below:

Col. 20, l. 60    "$[X(i)-\bar{X}(1)-\bar{X}(2)]=$ where $A_{221}[X(3)]$" should be --$[X(i)-\bar{X}(1)-\bar{X}(2)]=X(3)$--

Col. 25, l. 65    "$X(i)$" should be --$\bar{X}(i)$--

Col. 25, l. 70    "or M hd mnq(i)" should be --or $M_{mnq}(i)$--

Col. 27, l. 80 (3rd line from bottom)    "referene" should be --reference--

Signed and Sealed this

Eleventh Day of May 1982

[SEAL]

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,284,177
DATED : Aug. 18, 1981
INVENTOR(S) : John A. Domek

It is certified that error appears in the above-identified patent and that said Letters Patent are hereby corrected as shown below:

Col. 16, Eq. 27, "$\left[H[X(i)]\right] B[X(i,i + c)]$" should read

-- $\left[H[X(i)]\right]^{B[X(i,i+c)]}$ --

Col. 16, Eq. 28, "$]\}B'[X(i,i+c)]$" should read

-- $]\}^{B'[X(i,i+c)]}$ --

Signed and Sealed this

First Day of January 1985

[SEAL]

Attest:

GERALD J. MOSSINGHOFF

Attesting Officer

Commissioner of Patents and Trademarks